United States Patent [19]

Welton

[11] 4,072,259

[45] Feb. 7, 1978

[54] METHOD OF AND APPARATUS FOR OPENING SCORES IN A GLASS SHEET

[75] Inventor: Sanford M. Welton, Mount Holly Springs, Pa.

[73] Assignee: PPG Industries, Inc., Pittsburgh, Pa.

[21] Appl. No.: 772,363

[22] Filed: Feb. 25, 1977

[51] Int. Cl.² .............................................. B26F 3/00
[52] U.S. Cl. ...................................... 225/2; 225/96.5
[58] Field of Search ................... 225/2, 96.5, 103, 104, 225/105

[56] References Cited

U.S. PATENT DOCUMENTS

| | | | |
|---|---|---|---|
| 3,372,847 | 3/1968 | Walters et al. | 225/2 |
| 3,909,226 | 9/1975 | McCourty | 225/96.5 X |

Primary Examiner—J. M. Meister
Attorney, Agent, or Firm—Donald Carl Lepiane

[57] ABSTRACT

Lateral scores in an annealed glass ribbon are opened by applying a bending moment about the score while applying additional tension to the glass ribbon adjacent its edges.

19 Claims, 5 Drawing Figures

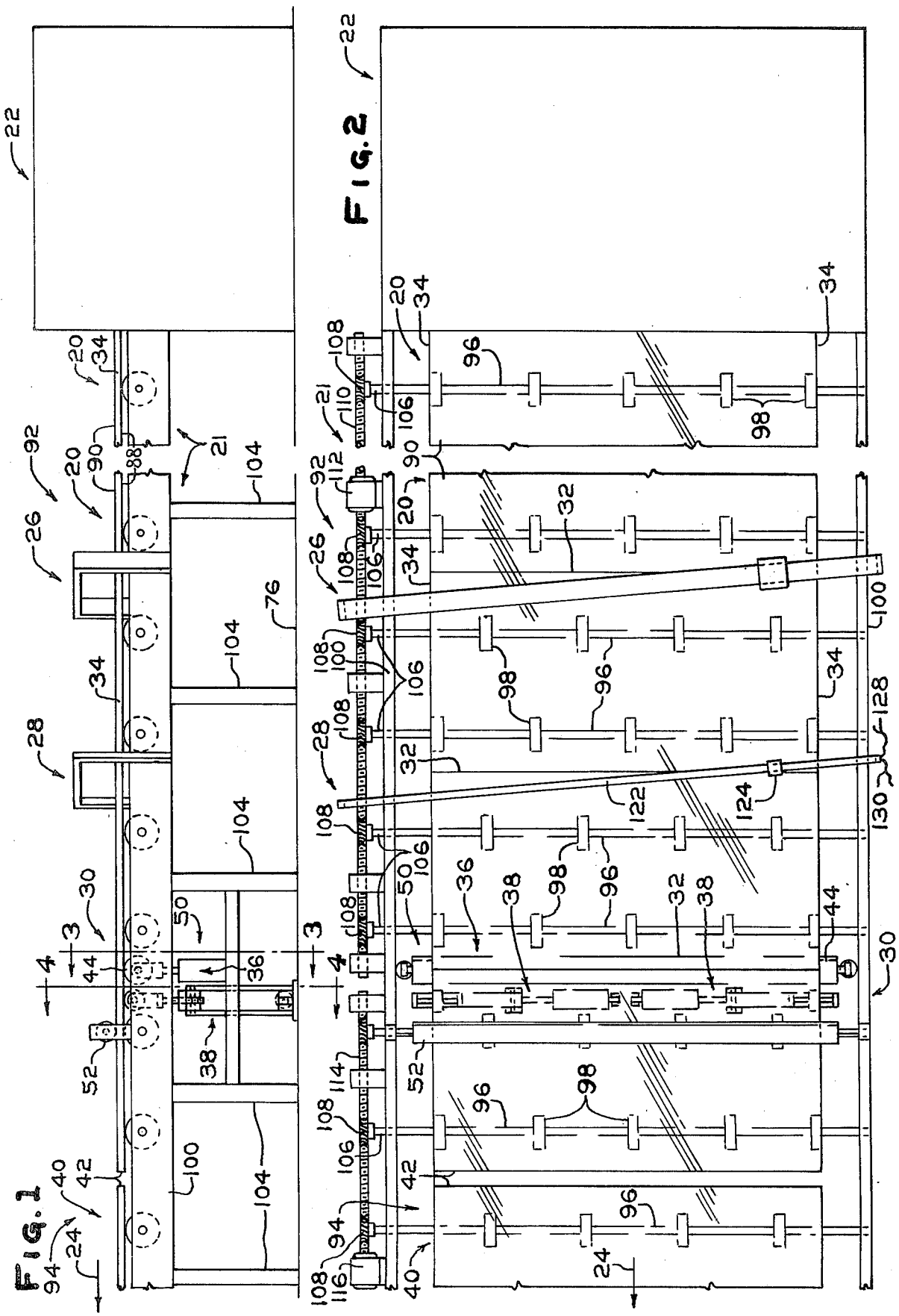

METHOD OF AND APPARATUS FOR OPENING SCORES IN A GLASS SHEET

BACKGROUND OF THE INVENTION

1. Field of the Invention

This invention relates to a method of and apparatus for opening scores in a glass sheet and more particularly to opening lateral scores in a moving annealed glass ribbon.

2. Discussion of Technical Problems

As is known in the glass art, a continuous glass ribbon is advanced from an annealing lehr through a scoring station and a snapping station to sever the glass ribbon into pieces or caps of a predetermined size.

The cut edge of the glass pieces or caps are preferably free of damage due to score opening. In other words, it is preferred that the cut edge have only scoring damage and not score opening or severing damage because cut edge damage due to scoring is controllable and therefore the quality of the glass cut edge can be controlled. However, cut edge damage resulting from score opening is not controllable.

Cut edge damage resulting from score opening is due to the stress pattern in the glass ribbon. More particularly, the edges of the glass ribbon are in compression relative to the ribbon center which is in tension. The compressive stresses at the ribbon edges counteract the bending moments applied about the score. When the glass is severed along the score line, the resulted cut edge is jagged, i.e., has shark teeth. This damage is removed by grinding, seaming or another cutting operation to increase the cut edge strength of the glass.

It would be advantageous, therefore, to provide an apparatus for and method of opening score lines in a glass ribbon such that the cut edge of the glass has only score damage.

SUMMARY OF THE INVENTION

This invention relates to an improved method of severing a glass sheet having two opposed edges in compression relative to the center of the glass sheet. The method includes the step of scoring the sheet between opposed edges in compression with a score along an intended path of cut and applying a bending moment at a first position about the score to sever the sheet. The improvement includes the steps of applying additional tension to the sheet adjacent the edges at a second position spaced from the first position while practicing the step of applying a bending moment about the score.

This invention also relates to an improved apparatus for severing the glass sheet. The apparatus is of the type having facilities for advancing the sheet along a sheet movement path and facilities for scoring the sheet in a direction transverse to the movement path. The improved apparatus includes facilities mounted transverse to the movement path for applying a bending moment to the sheet about the score and facilities mounted in the movement path and downstream of the bending moment facilities for applying tension to the glass sheet adjacent its edges.

BRIEF DESCRIPTION OF THE DRAWING

FIG. 1 is a side elevated view of a system for conveying a glass ribbon from an annealing lehr through a scoring station and a snapping station incorporating features of the invention;

FIG. 2 is a top view of the conveying system shown in FIG. 1;

DESCRIPTION OF THE INVENTION

Figure 3:
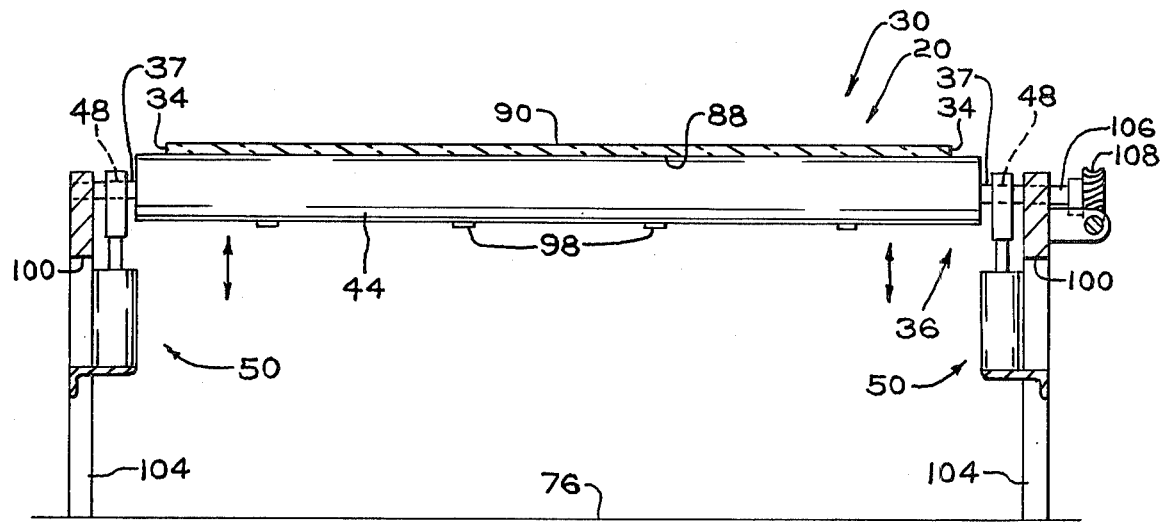
FIG. 3 is a view taken along lines 3—3 of FIG. 1 and having portions removed for purposes of clarity.

As shown in FIGS. 1 and 2, a glass ribbon 20 is advanced by conveyor 21 from an annealing lehr 22 in the direction of the arrow 24, past scoring station 26, inspection station 28 and score opening station 30 incorporating features of the invention.

The annealing lehr 22 may be any of the types used in the glassmaking art for annealing a glass ribbon. The glass ribbon 20 may be formed in any conventional manner, e.g., by the float process as taught in U.S. Pat. No. 3,083,551. The teachings of U.S. Pat. No. 3,083,551 are incorporated by reference. The scoring station 26 may be any of the types used in the glass scoring art for imposing a score 32, i.e., a lateral score in the glass ribbon 20 between its edges 34. The scoring station may be of the type taught in U.S. Pat. No. 3,244,337 which teachings are hereby incorporated by reference. The inspection 28 may be any of the types used in the glass inspecting art for measuring stress between the edges 34 of the glass ribbon 20. The conveyor 21 may be any of the types used in the conveying art for advancing the glass ribbon 20 along a predetermined ribbon or sheet movement path in the direction of the arrow 24. For example, the conveyor 21 may be of the type taught in U.S. Pat. No. 3,244,337.

As will be further appreciated, the conveyor 21, the annealing lehr 22, the scoring station 26, and the inspection station 28 are not limiting to the invention and are presented to illustrate the environment in which the invention may be practiced.

At the score opening station 30, the lateral scores 32 are opened by snap roll 36 and tension applying devices 38 incorporating features of the invention (see also FIGS. 3-5) to sever the glass ribbon 20 into pieces of glass or glass caps 40 of predetermined size. After the scores 32 are opened, the caps 40 are preferably moved downstream of the score opening station 30 at a speed greater than the speed of the glass ribbon to prevent damage to the glass edges 42 due to adjacent glass edges 42 contacting one another.

The snap roll 36 may be any of the type used in the art to raise the glass ribbon 20 at the score line 32 to apply bending forces to the score 32 to open same. For example, and with reference to FIG. 3, the snap roll 36 includes a cylindrical rubber body 44 mounted on a shaft 46. Each end 48 of the shaft 46 is freely mounted in an elevator 50 to raise and lower the cylindrical body 44.

When a lateral score 32 passes over the snap roll 36, the elevators 50 raise the snap roll 44 to raise the glass ribbon 20 out of the plane of the movement path 24. Raising the glass ribbon applies bending forces about the score 32 to open same. The bending forces are generated by the weight of the glass applying a downward force on each side of the score 32 as the snap roll 36 applies an upward force.

If the weight of the ribbon on the upstream or downstream side of the score 32 is not sufficient to apply the required downward force, a holddown roll 52 (one only shown downstream of snap roll 36 in FIGS. 1 and 2) of the type used in the art may be used. The holddown roll 52 is mounted above and transverse to the movement path 24 spaced from the snap roll 36.

As will become apparent, the snap roll 36 and holddown roll 52 are not limiting to the invention and any of the types used in the glass cutting art may be used in the practice of the invention.

As shown in FIGS. 1 and 2, the tension applying devices 38 incorporating features of the invention are mounted immediately downstream to the snap roll 36. The devices 38 put glass edges 42 of the glass ribbon 20 in tension to reduce the compression at the glass edges 42 thereby minimizing, if not eliminating, cut edge damage due to score opening.

The glass edge 42 of the annealed glass ribbon 20 are in compression relative to the ribbon center which is in tension because of higher fictivity, e.g., lower density of glass at the ribbon edges with respect to the ribbon center. The lower glass density at the edges 42 is due to the cooling regime normally followed in annealing lehrs.

In general, the compression glass edges 34 is a function of glass thickness and the cooling regime in the annealing lehr. It has been found that when compression at the edges is less than a certain value, there is little if any damage on the cut edge due to score opening, e.g., jagged edges of glass normally called shark's teeth. For example, an annealed glass ribbon having a thickness of ⅛ inch (0.32 centimeter) and a compression of less than about 50 mils has little, if any, cut edge damage due to score opening. An annealed glass ribbon having a thickness of about 3/16 inch (0.48 centimeter) and a compression value of less than about 70 mils and an annealed glass ribbon having a thickness of about 5/16 inch (0.80 centimeter) and a compression value of less than about 80 mils have little, if any, cut edge damage due to score opening.

As the compression value increases for a given glass thickness, the probability of cut edge damage due to score opening increases.

Although it has been found that applying tension adjacent the edges of the glass ribbon according to the teachings of the invention minimizes, if not eliminates glass edge damage due to score opening, an acceptable score should be imposed in the glass ribbon. In other words, the score imposed in the glass ribbon should extend through the outer compression layer of the glass ribbon. For example, the glass sheet normally has its opposed major surfaces in compression and the center in tension. The score preferably extends through the compression layer of a major glass surface so that the glass is severed along the score.

Figure 4:
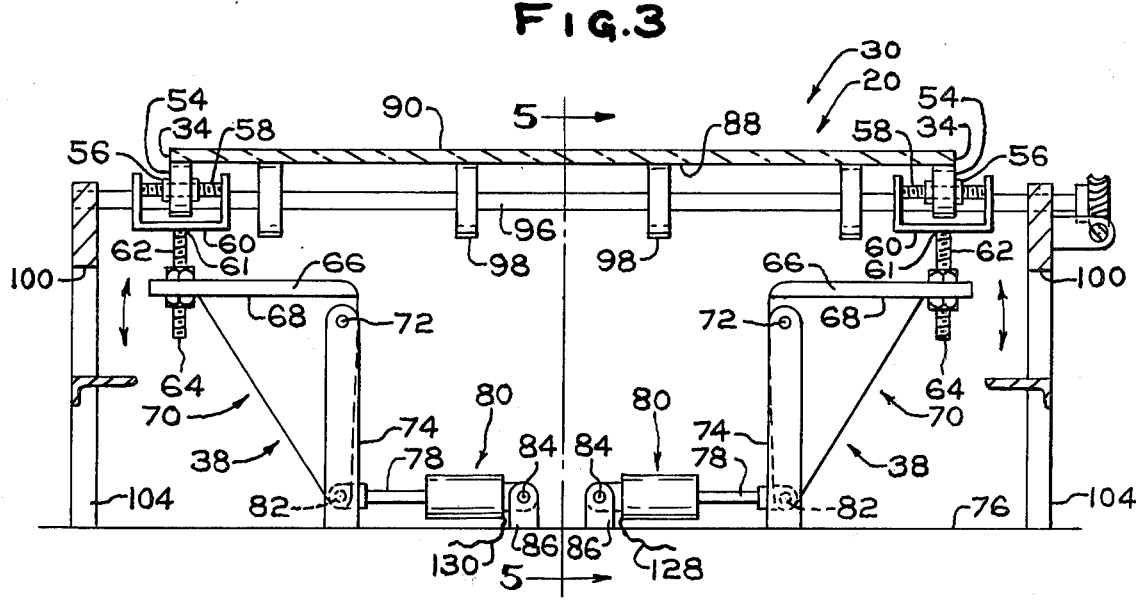
FIG. 4 is a view taken along lines 4—4 of FIG. 1 and having portions removed for purposes of clarity.
Figure 5:
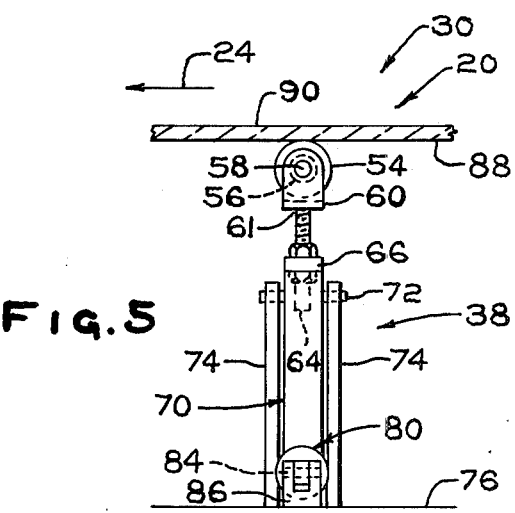
FIG. 5 is a view taken along lines 5—5 of FIG. 4 and having portions removed for purposes of clarity.

With reference to FIGS. 4 and 5, the discussion will now be directed to the tension applying devices 38 incorporating features of the invention. The tension applying devices 38 each include a wheel 54 rotatably mounted on nut 56 (shown in FIG. 5) in any conventional manner. The nut 56 is mounted on a threaded shaft 58 having its ends mounted in a bifurcated member 60. In this manner, the wheel 54 may be positioned on the shaft 58 to engage the glass ribbon 20 at a predetermined spaced location from adjacent glass ribbon edge 34.

The bifurcated member 60 is mounted on end 61 of a threaded shaft 62 and the other end 64 of the shaft 62 is threaded through a bar 66 mounted on side 68 of a triangular member 70. In this manner for a given displacement of the triangular member 70, the displacement of the wheel 54 may be adjusted.

The triangular member 70 is pivotally mounted at 72 to a pair of struts 74 (shown better in FIG. 5) mounted on a platform advantageously mounted below the conveyor 21 or mounted on the floor 76 as shown in FIGS. 1 and 4. Piston 78 of cylinder 80 is pivotally mounted at 82 to the triangular member 70. End 84 of the cylinder 80 is pivotally mounted to a stationary plate 86.

With reference to FIG. 4, extending the piston 78 out of the cylinder 80 operates on the triangular member 70 to urge the wheel 54 against the glass ribbon 20 to raise the ribbon 20 upward as viewed in FIG. 4 to put the glass ribbon edges 34 in tension. Withdrawing the piston 78 into the cylinder 80 displaces the wheel 54 downward, as viewed in FIG. 4, away from the glass ribbon 20.

The amount of tension or the decrease in compression at the glass ribbon edges 34 is a function of displacement of the glass ribbon above the movement path; the position that the wheel 54 engages the ribbon spaced from glass ribbon edges 34; and the distance between the wheel 54 and the snap roll 36. Increasing the displacement of the ribbon 20 above the movement path 24 while maintaining the remaining parameters constant increases the tension or decreases the compression at the glass ribbon edges 34 and vice versa. Decreasing the spaced distance between the glass ribbon edges 34 and the wheel 54 while maintaining the remaining parameters constant, increases the tension or decreases the compression at the glass ribbon edges 34 and vice versa. Decreasing the distance between the wheel 54 and the snap roll 36 while maintaining the remaining parameters constant, increases the tension or decreases the compression at the glass ribbon edges 34 and vice versa.

The glass ribbon as it is raised by the snap roll takes on a radius prior to opening the lateral scores. The tension applying devices 38 of the instant invention raise the glass edges or an edge to increase the radius thereby putting tension on or decreasing compression at the glass edges or edge.

As will be appreciated by those skilled in the art, the compression at the edge 34 of the glass ribbon 20 is permanent and is not actually reduced by the tension applying devices. However, the tension applying devices 38 put the bottom surface 88 of the glass ribbon 20 adjacent its edges 34 in compression which in turn puts the top surface 90 of the glass ribbon 20 adjacent its edges 34 in tension. Even though the compressive stresses at the glass edges 34 are permanent, the glass is subjected to tension stresses which tend to reduce the compressive stresses at the glass ribbon edges during opening of the score 32. In this manner, the glass ribbon can be severed along the score line with the cut edge having only scoring damage.

As can be appreciated, the invention may be practiced on edge 34 of the glass ribbon 20 or simultaneously at opposed edges 34 of the glass ribbon 20.

Further, as can now be appreciated, variations may be made within the invention without deviating from the scope. For example, the inspection station 28 may be used to control each of the tension applying devices 38. In this manner, the glass ribbon is inspected between its edges for compression. If the compression at an edge is greater than a predetermined value, a signal is forwarded in any conventional manner to the respective tension applying devices 38 to actuate same during score opening.

Detailed Description of the Invention

The invention is used to open lateral scores 32 in a glass ribbon 20 having a thickness of about 3/16 inch (0.48 centimeter) and a width of about 160 inches (4 meters) to provide caps 40 having a width as measured between the leading edge and trailing edge of about 30 inches (0.75 meter).

With reference to FIGS. 1 and 2, conveyor 21 includes a first conveyor section 92 between exit end of annealing lehr 22 and score opening station 30 and a second conveyor section 94 extending downstream of the score opening station 30. Each of the conveyor sections 92 and 94 include a plurality of shafts 96 each having a plurality of donut rolls 98 mounted thereon. The ends of the shafts 92 are rotatably mounted in longitudinal members 100 held above floor 76 by vertical struts 104. With specific reference to FIG. 2, end 106 of each shaft 96 has a gear wheel 108 (shown better in FIG. 3).

Referring now to FIG. 1, the shafts 96 upstream of score opening station 30 are rotated by worm gear 110 and motor 112 to advance the glass ribbon at a speed of about 25 feet per minute (7.5 meters per minute). The shafts 92 downstream of the score opening station are rotated by worm gear 114 and motor 116 to advance caps 40 away from the score opening station 30 at a speed of about 167 feet per minute (50 meters per minute).

A score opening station 26 mounted about 396 feet (118 meters) downstream of the exit end of the annealing lehr 22 includes a bridge 118 having a scoring device 120 mounted thereon to laterally score the moving glass ribbon 20. The scoring bridge 118 is of the type taught in U.S. Pat. No. 3,244,337. The lateral scores 32 imposed in the glass ribbon have a depth of about 0.020 inch (0.05 centimeter) and are normal to glass ribbon edges 34.

Mounted about 447 feet (134 meters) downstream of the exit end of the annealing lehr 22 is an inspection station 28 including a bridge 122 mounted above and transverse to the glass ribbon path. A device 124 of the type used in the art for measuring stresses in the glass ribbon between its edges is mounted on the bridge 122. The bridge 122 is angled with respect to the movement path 24 such that the scan path on the glass ribbon is normal to the glass ribbon edges 34.

A score opening station 30 is mounted about 500 feet (150 meters) downstream of the exit end of the annealing lehr 22. The score opening station 30 includes a lift roll 36 (see FIG. 3) and a pair of tension applying devices 38 (see FIG. 4) incorporating features of the invention.

With reference to FIGS. 1, 2 and 5, the lift roll 36 includes a rubber cylinder 44 having a diameter of about 9 inches (0.9 meter) and a length of about 168 inches (13.2 meters) mounted on shaft 46. Each end 48 of the shaft 46 is rotatably mounted in an elevator 50 to raise the cyliner 44 about ½ inch (1.27 centimeter) above the plane of the movement path 24.

Referring now to FIGS. 1, 2, 4 and 5, each of the tension applying devices 38 include a nylon wheel 54 having an outside diameter of about 3 inches (7.62 centimeters) and a thickness of about ¾ inch (1.92 centimeter). The wheel 54 and lift roll 44 are on a center-to-center spacing of about 12 inches (0.3 meter). The wheel 54 is mounted on a nut which in turn is mounted on threaded shaft 58 supported in a bifurcated member 60.

The bifurcated member 60 is mounted on end 61 of a threaded shaft 62 and the other end 64 of the shaft 62 is mounted on a metal plate 66. The metal plate 66 is mounted on side 68 of metal triangular member 70. The triangular plate 70 is pivotally mounted at 72 to a pair of struts 74 and at 74 to piston 78 of cylinder 80. The piston 78 has a 1 inch stroke. End 84 of the cylinder 80 is pivotally mounted to plate 86. The struts 74, plates 86 and elevators 50 of the lift roll 36 are mounted on platform 76 spaced above the floor by adjacent struts 102 as shown in FIG. 1.

The wheels 54 are adjusted on their respective shaft 58 to engage the glass ribbon 20 spaced about 8 inches (20.32 centimeters) from adjacent glass ribbon edge 34. The triangular plate 70 is sized and the bifurcated member 60 adjusted on its respective shaft 62 to raise the glass ribbon about 1 inch (2.54 centimeters) out of the movement path when the piston 78 is extended out of the cylinder 80.

The glass ribbon 20 is advanced from exit end of the annealing lehr 22 through the scoring station 26 and inspection station 28 into the score opening station 30 by the first conveyor section 92. Lateral scores 32 are imposed in the glass ribbon 20 spaced about 30 inches (0.75 meter) apart. At the inspection station 28, the stress between the glass ribbon edges 34 adjacent the score 32 is measured by the inspection device 124.

If the compression adjacent the edges is less than 70 mils, the tension applying devices 38 at the score opening station are not activated.

The glass ribbon 20 advances from the inspection station 28 into the snapping station 30. With reference to FIGS. 1-3, when the lateral score 32 is over the cylindrical body 44, the elevators 50 are energized in any conventional manner to raise the cylindrical body 44 to open the score 32 and sever the glass. The cap 40 is advanced by the second conveyor section 94 away from the score opening station 30.

If the inspection device 124 indicates that the stress at an edge, e.g., the right edge as viewed in FIG. 4, is greater than 70 mils, a signal is sent by way of wire 128 to the right tension applying device 38. When the score is over the lift roll 36, the cylindrical body 44 is raised upward as previously discussed. Simultaneously, the cylinder 80 of the right tension applying device 38 is activated to move the piston 78 out of the cylinder 80 to raise the wheel 54 upward as viewed in FIG. 3. The wheel 54 raises the glass ribbon above the movement path to put tension on the right glass ribbon edge as viewed in FIG. 4.

The score 32 is opened and the cap 4 moved downstream of the score opening station 30 as previously discussed.

If the inspection device 124 indicates that compression at both edges 34 of the glass ribbon 20 is greater than 70 mils, a signal is forwarded to the right and left tension device along wires 128 and 130, respectively. When the scored glass ribbon is at the scoring station 30, the cylindrical roll 44 is raised as previously discussed and the wheels 54 of both tension applying devices 38 are raised to open the score as was discussed for the right tension applying device 38 as viewed in FIG. 4.

The resulting cap 40 is advanced downstream of the score opening station 30 as previously discussed.

As can now be appreciated, the above example is not limiting to the invention and is presented for illustration purposes only.

What is claimed is:

1. In a method of severing a glass sheet having two opposed edges in compression relative to center of the glass sheet, wherein the method includes the steps of scoring the sheet between the opposed edges in compression with a score along an intended path of cut, and applying a bending moment at a first position about the score to sever the glass sheet, the improvement comprising:
   applying tension to the glass sheet adjacent at least a one of the edges in compression at a second position spaced from the first position; while
   practicing the step of applying a bending moment about the score.

2. The severing method as set forth in claim 1 wherein the sheet lies in a generally horizontal plane and the bending moment applying step includes the step of raising the sheet at the first position out of the horizontal plane to a bending moment plane and wherein said step of applying tension includes the step of:
   moving the at least one edge of the sheet away from the horizontal plane at the second position.

3. The severing method as set forth in claim 1 wherein the glass sheet is a glass ribbon advancing along a predetermined plane and the bending moment applying step includes the step of moving the ribbon out of the predetermined plane to a bending moment plane and wherein said step of applying tension is practiced downstream of position at which bending moment is applied and includes the step of:
   moving the at least one edge of the ribbon away from the predetermined plane.

4. The method as set forth in claim 3 wherein the predetermined plane is a horizontal plane and said step of moving the at least one edge of the ribbon away from the predetermined plane includes the step of raising the at least one edge away from the horizontal plane.

5. The method as set forth in claim 4 further including the steps of:
   measuring compression at opposed edges of the glass ribbon; and
   practicing said applying step at an edge exceeds a predetermined compression value.

6. The method as set forth in claim 5 wherein the ribbon is an annealed glass ribbon.

7. The method as set forth in claim 5 wherein the glass ribbon has a thickness of about 3/16 inch (0.48 centimeter) and the predetermined compression value is about 70 mils.

8. The method as set forth in claim 5 wherein the glass ribbon has a thickness of about 5/16 inch (0.80 centimeter) and the predetermined compression value is about 80 mils.

9. The method as set forth in claim 5 wherein the glass ribbon has a thickness of about ⅛ inch (0.32 centimeter) and the predetermined compression value is 50 mils.

10. The method as set forth in claim 3 wherein the glass ribbon prior to severing the score has a given radius and said step of applying tension alters the given radius.

11. The method as set forth in claim 10 wherein said step of applying tension increases the given radius.

12. An apparatus for severing a glass sheet wherein the apparatus is of the type having means for advancing the glass sheet along a sheet movement path; means for scoring the sheet in a direction transverse to the movement path; the improvement comprising:
   means mounted in the movement path for applying a bending moment to the glass sheet about the score; and
   means mounted in the movement path in spaced relation to said bending moment applying means for applying tension adjacent at least one edge of the glass sheet.

13. The apparatus as set forth in claim 12 wherein said tension applying means includes:
   a pair of members mounted in spaced relation to one another about the movement path;
   means for raising each of said pair of members out of the movement path.

14. The apparatus as set forth in claim 13 further including:
   means for displacing each of said pair of members along a reciprocating linear path.

15. The apparatus as set forth in claim 12 wherein the sheet movement path is along a horizontal plane and said tension applying means includes:
   a pair of tension applying devices mounted in spaced relation to one another below and about the movement path, each of said tension applying devices including:
   wheel means; and
   means acting on each of said wheel means for displacing said wheel means through and out of the movement path.

16. The apparatus as set forth in claim 15 wherein said wheel means includes:
   a wheel rotatably mounted on an internally threaded disc;
   a threaded shaft supporting said disc for selectively moving said wheel along a reciprocating linear path;
   said displacing means including:
   a pivotally mounted member;
   means for supporting said shaft mounted on said member; and
   means acting on said member for pivoting said wheel through and out of said horizontal plane.

17. The apparatus as set forth in claim 14 further including:
   means for determining compression at edges of the glass sheet; and
   means operatively connected to said determining means and acting on each of said displacing means to actuate said displacing means when said determining means determines a compression value at an edge of the ribbon greater than a predetermined value.

18. The apparatus as set forth in claim 12 wherein the glass sheet is an annealed glass ribbon.

19. The apparatus as set forth in claim 12 wherein said applying tension means is downstream of said bending moment applying means.

* * * * *